US006957642B2

United States Patent
Miura

(10) Patent No.: US 6,957,642 B2
(45) Date of Patent: Oct. 25, 2005

(54) EXHAUST GAS RECIRCULATION CONTROL SYSTEM

(75) Inventor: Manabu Miura, Zushi (JP)

(73) Assignee: Nissan Motor Co., Ltd., Yokohama (JP)

( * ) Notice: Subject to any disclaimer, the term of this patent is extended or adjusted under 35 U.S.C. 154(b) by 5 days.

(21) Appl. No.: 10/883,853

(22) Filed: Jul. 6, 2004

(65) Prior Publication Data

US 2005/0022511 A1 Feb. 3, 2005

(30) Foreign Application Priority Data

Jul. 31, 2003 (JP) .................................... 2003-283288

(51) Int. Cl.[7] ........................ F02M 25/07; F02B 47/08; F02D 11/10
(52) U.S. Cl. ............. 123/399; 123/568.16; 123/568.21; 60/285
(58) Field of Search ............................... 123/293, 305, 123/361, 399, 478, 480, 494, 568.11, 568.16, 568.19, 568.21, 568.23–568.28; 60/274, 276, 285; 701/108

(56) References Cited

U.S. PATENT DOCUMENTS

| | | |
|---|---|---|
| 5,732,554 A | 3/1998 | Sasaki et al. |
| 6,016,788 A * | 1/2000 | Kibe et al. .................. 123/399 |
| 6,155,230 A * | 12/2000 | Iwano et al. ................. 123/399 |
| 6,401,703 B1 * | 6/2002 | Mamiya et al. .............. 123/295 |
| 2005/0022516 A1 * | 2/2005 | Miura ........................... 60/285 |

FOREIGN PATENT DOCUMENTS

JP          8-218920 A    8/1996

* cited by examiner

Primary Examiner—Willis R. Wolfe, Jr.
(74) Attorney, Agent, or Firm—Shinjyu Global LP; Counselors, LLP

(57) ABSTRACT

An engine exhaust gas cleaning apparatus is provided to suppress EGR ratio fluctuations when the excess air ratio is adjusted and thereby stabilize the engine operating performance. The engine exhaust gas cleaning apparatus comprises an exhaust gas recirculation control valve configured to recirculate a portion of the exhaust gas from the exhaust system to the air intake system and feedback control the quantity of the recirculated exhaust; an intake air throttle valve arranged in the air intake system at a position upstream of the position where an exhaust gas recirculation passage connects to the air intake system; an excess air ratio control section configured to change the intake air quantity by using the intake air throttle valve in response to a request to adjust the excess air ratio; and a feedback control restricting section configured to temporarily prohibit feedback control of the exhaust gas recirculation quantity delivered by the exhaust gas recirculation control valve, or to temporarily lower the gain of the feedback control, when the excess air ratio is being adjusted.

19 Claims, 4 Drawing Sheets

EXHAUST GAS RECIRCULATION CONTROL SYSTEM

BACKGROUND OF THE INVENTION

1. Field of the Invention

The present invention generally relates to exhaust gas recirculation control apparatuses for internal combustion engines. More specifically, the present invention relates to an exhaust gas recirculation apparatus that regenerates an exhaust gas cleaning device by changing the excess air ratio.

2. Background Information

In internal combustion engines such as diesel engines, an exhaust gas recirculating system (EGR system) is widely used wherein a part of the exhaust gas is recirculated to lower the combustion temperature in order to reduce discharge of nitrogen oxide (NOx). A NOx trapping catalytic converter traps NOx in the exhaust gas when an air-fuel ratio in the exhaust gas is in a lean range and purifies (releases) the trapped NOx when the air-fuel ratio is in a rich range. The NOx deposited in the NOx trapping catalytic converter is typically purified when the amount of adsorbed and held NOx reaches a prescribed upper limit value.

One example of an internal combustion engine having a NOx trapping catalytic converter provided in an exhaust system for cleaning NOx discharged from the engine is disclosed in U.S. Pat. No. 5,732,554 (also see, Japanese Laid-Open Patent Publication No. 08-218920). The NOx trapping catalytic converter described in that document is configured to adsorb and hold NOx contained in the exhaust gas when the excess air ratio is lean, and to desorb and deoxidize the adsorbed NOx when the excess air ratio is rich. These types of NOx trapping catalytic converters are generally applied to internal combustion engines that are normally operated at a lean excess air ratio. When the amount of adsorbed and held NOx reaches a prescribed upper limit value, the NOx trapping catalytic converter can no longer adsorb and hold more NOx. Consequently, the amount of held NOx is estimated and the NOx trapping catalytic converter is regenerated.

When the NOx trapping catalytic converter is regenerated, an intake air throttle valve or the like is used to reduce the amount of intake air into the engine to reduce the excess air ratio to a richer target value. Simultaneously, the fuel injection amount is increased such that the excess air ratio converges on the richer target value.

In view of the above, it will be apparent to those skilled in the art from this disclosure that there exists a need for an improved internal combustion engine exhaust gas recirculation control system. This invention addresses this need in the art as well as other needs, which will become apparent to those skilled in the art from this disclosure.

SUMMARY OF THE INVENTION

It has been discovered that in cases where exhaust gas recirculation (EGR) is being conducted in conjunction with using a NOx trap catalyst in order to reduce NOx emissions, if the opening degree of the intake air throttle valve is reduced, the negative pressure of the air intake system will increase and the EGR quantity will increase even if the opening degree of the EGR valve does not change. Therefore, if the opening degree of the intake air throttle valve is suddenly reduced in order to adjust the excess air ratio during regeneration of the NOx trap catalyst, the EGR quantity will increase accordingly and the engine operating performance will degrade, including an increase in smoke.

Therefore, during regeneration of the NOx trap catalyst, it is necessary to reduce the opening degree of the EGR valve simultaneously with the reduction of the opening degree of the intake air throttle valve in order to maintain the target EGR ratio during rich operation and prevent a sudden increase in the EGR quantity. However, if the opening degree of the EGR valve is feedback controlled, the feedback control will undergo hunting if the opening degree of the EGR valve is corrected in correspondence with the opening degree of the intake air throttle valve because the actual change in the intake air quantity is delayed with respect to the change in the opening degree of the intake air throttle valve.

More specifically, if the opening degree of the EGR valve is greatly reduced before the actual intake air quantity matches the change in the opening degree of the intake air throttle valve, the EGR quantity will decrease too much. Then, the system will detect the excessive decrease and attempt to increase the opening degree of the EGR valve so as to increase the EGR quantity. In short, this kind of correcting operation will be performed repeatedly (i.e., hunting will occur).

Thus, when the excess air ratio is adjusted, the exhaust gas recirculation ratio fluctuates greatly and causes the engine output to fluctuate. As a result, vibrations, noise, and other phenomena occur which have an adverse effect on the operating performance.

One object of the present invention is to provide an engine exhaust gas recirculation control system that avoids these problems. In other words, the engine exhaust gas recirculation control system of the present invention was basically contrived to avoid to the greatest extent possible the adverse effects on operating performance that can result from hunting of the EGR control when the excess air ratio is reduced.

In view of the forgoing, an engine exhaust gas recirculation control system is provided for an engine that basically comprises an exhaust gas recirculation control device, an intake air regulating device and a control unit. The exhaust gas recirculation control device is configured to recirculate a portion of exhaust gas from an exhaust system of an engine to an air intake system of the engine. The intake air regulating device is arranged in the air intake system at a position upstream of a position where the exhaust gas recirculation control device connects to the air intake system. The control unit is configured to control the exhaust gas recirculation control device and the intake air regulating device. The control unit includes a feedback control section, an excess air ratio control section and a feedback control restricting section. The feedback control section is configured to feedback control an exhaust gas recirculation quantity of the exhaust gas to be recirculated to the air intake system. The excess air ratio control section is configured to adjust an excess air ratio in response to a request to change the excess air ratio by using the intake air regulating device to change an intake air quantity. The feedback control restricting section is configured to temporarily restrict feedback control of the exhaust gas recirculation quantity delivered by the exhaust gas recirculation control device when the excess air ratio is being adjusted.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
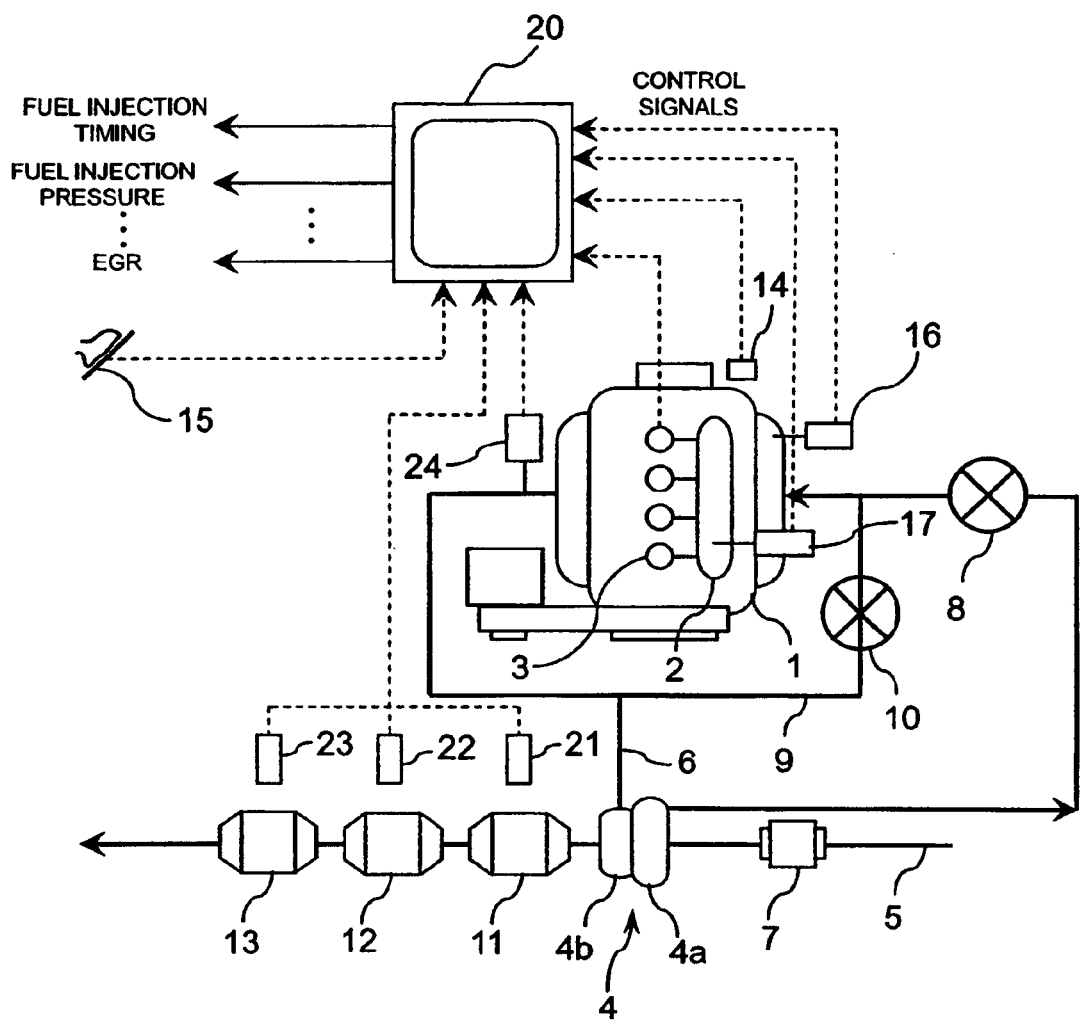
FIG. 1 is a diagrammatic view of an exhaust gas recirculation control apparatus or system for an internal combustion engine, e.g., a diesel engine, in accordance with one embodiment of the present invention.

Referring initially to FIG. 1, an exhaust gas recirculation control apparatus or system is illustrated for an internal combustion engine such as a supercharged diesel engine 1 in accordance with a first embodiment of the present invention. The exhaust gas recirculation control apparatus in accordance with the present invention can be applied to other internal combustion engines used in automobiles and the like.

As shown in to FIG. 1, the engine 1 includes a common rail fuel injection system including a common rail 2, a plurality of fuel injection valves 3, and a high-pressure fuel pump (not shown) so as to be supplied with pressurized fuel. The fuel pump (not shown) pumps fuel to the common rail 2, where the pressurized fuel accumulates, and high-pressure fuel is delivered to the inside of the combustion chambers when the fuel injection valves 3 are opened. Thus, the fuel injection valves 3 inject fuel directly into respective combustion chambers (not shown) of each cylinder.

The fuel injection valves 3 are configured and arranged to execute a pilot injection before the main injection or executing a post-injection following the main injection. By changing the accumulation pressure of the common rail 2, the fuel injection pressure can be controlled in a variable manner.

A turbocharger (supercharger) 4 having a compressor 4a is arranged in an air intake passage 5 of the air intake system. The compressor 4a serves to pressurize the intake air. The compressor 4a is rotated by a turbine 4b that is driven by exhaust gas flowing through an exhaust passage 6. The supercharger 4 is positioned downstream of an air flow meter 7 in the air intake passage 5 of the engine 1. Preferably, the supercharger 4 is a variable-capacity type supercharger having a variable nozzle provided on the turbine 4b. By using a variable-capacity type supercharger 4, the variable nozzle can be constricted when the engine 1 is operating in a low speed region to increase the turbine efficiency. The variable nozzle of the supercharger 4 can be opened when the engine 1 is operating in a high speed region to increase the turbine capacity. Thus, this arrangement enables a high supercharging effect to be obtained over a wide range of operating conditions.

An intake air throttle valve 8 is installed inside the air intake passage 5 at a location downstream of the compressor 4a. The intake air throttle valve 8 serves as an intake air regulating device to make it possible to control the quantity of intake air drawn into the engine 1. The intake air throttle valve 8 is, for example, an electronically controlled throttle valve whose opening degree can be varied freely using a stepper motor.

The exhaust passage 6 is provided with an exhaust gas recirculation (EGR) passage 9 that branches from a position between the engine 1 and the turbine 4b. The EGR passage 9 connects to the air intake passage 5 downstream of the intake air throttle valve 8.

The exhaust system is provided with an exhaust gas recirculation (EGR) control valve 10 that is installed in the EGR passage 9. The EGR valve 10 serves to control the exhaust gas recirculation quantity in accordance with the engine operating conditions. The EGR valve 10 is electronically controlled using a stepper motor such that the opening degree of the EGR valve 10 regulates the flow rate of the exhaust gas recirculated to the air intake system, i.e., the EGR quantity drawn into the engine 1. The EGR valve 10 is feedback (closed-loop) controlled to regulate the EGR quantity in such a manner as to achieve an EGR ratio set in accordance with the operating conditions.

The flow rate of the air drawn into the engine main body 1 is determined according to the engine rotational speed at that particular time, which depends on the fuel injection quantity, and is equal to the total of the flow rate of fresh air from upstream of the intake air throttle valve 8 (hereinafter also called simply "intake air quantity") and the flow rate of recirculated exhaust gas (hereinafter called "EGR quantity") introduced downstream of the intake air throttle valve 8. Assuming the engine operating state does not change, the total flow rate does not change and, therefore, the fresh air intake flow rate decreases when the EGR quantity increases and increases when the EGR quantity decreases. The fresh air intake flow rate also changes depending on the opening degree of the intake air throttle valve 8, the fresh air intake flow rate being maximum when the intake air throttle valve 8 is fully open and decreasing as the opening degree becomes smaller.

Thus, once the target EGR ratio is determined, the target intake air quantity at that particular time, i.e., the target fresh air intake flow rate, is determined depending on the fuel injection quantity and the opening degree of the intake air throttle valve. As a result, the EGR quantity is relatively large when the actual intake air quantity is smaller than the target intake air quantity and, conversely, the EGR quantity is small when the actual intake air quantity is larger than the target intake air quantity.

Therefore, the EGR ratio can be feedback controlled by comparing the target intake air quantity to the actual intake air quantity that is measured and outputted by the air flow meter 7.

The exhaust system is also provided with an oxidation catalytic converter 11 having an HC adsorbing function, a NOx trapping catalytic converter 12 having a NOx trapping function, and an exhaust gas fine particle capturing filter (DPF=diesel particulate filter) 13 arranged in sequence in the exhaust passage 6 at a position downstream of the turbine 4b of the turbocharger 4.

The oxidation catalytic converter 11 has the characteristic of adsorbing exhaust HCs when the temperature is low and releasing the HCs when the temperature is high and it functions to oxidize HCs and CO when in an active state. The NOx trapping catalytic converter 12 adsorbs or traps NOx contained in the exhaust gas when the excess air ratio λ is greater than 1, i.e., when the air fuel mixture is lean, and releases the NOx when the excess air ratio λ is rich. The NOx trapping catalytic converter 12 also functions to deoxidize the NOx when in an active state. The particulate filter 13 captures fine particles (PM=particulate matter) contained in the exhaust gas and the captured PM is combusted by raising the exhaust gas temperature using regeneration control.

A control unit 20 is provided to control the exhaust gas recirculation control system of the present invention. In particular, the control unit 20 determines and sets the intake air quantity Qa, the fuel injection quantity Qf and the injection timing IT based on detection signals from various sensors (described below) that serve to detect the operating state of the engine 1 and executes the controls based on these signals as explained below. Thus, the control unit 20 also controls the drive of the fuel injection valves 3, controls the opening degree of the intake throttle valve 8 and the EGR valve 10 in response to detection signals from various sensors (described below).

The control unit 20 is a microcomputer comprising of a central processing unit (CPU) and other peripheral devices. The control unit 20 can also include other conventional components such as an input interface circuit, an output interface circuit, and storage devices such as a ROM (Read Only Memory) device and a RAM (Random Access Memory) device. The control unit 20 preferably includes an engine control program that controls various components as discussed below. The control unit 20 receives input signals from various sensors (described below) that serve to detect the operating state of the engine 1 and executes the aforementioned controls based on these signals. It will be apparent to those skilled in the art from this disclosure that the precise structure and algorithms for the control unit 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The intake air quantity Qa is detected by the air flow meter 7, which outputs a signal to the control unit 20 that is indicative of the intake air quantity Qa. The control unit 20 is also operatively coupled to a rotational speed sensor 14, an accelerator position sensor 15, an engine coolant temperature sensor 16, a rail pressure sensor 17, a plurality of exhaust system temperature sensors 21, 22 and 23, and an exhaust gas sensor or oxygen sensor 24. The rotational speed sensor 14 is configured and arranged to detect the engine rotational speed Ne of the engine 1, and output a signal to the control unit 20 that is indicative of the engine rotational speed Ne of the engine 1. The accelerator position sensor 15 is configured and arranged to detect the accelerator position APO, and output a signal to the control unit 20 that is indicative of the accelerator position APO.

The coolant temperature sensor 16 is configured and arranged to detect the temperature of the engine coolant Tw, and output a signal to the control unit 20 that is indicative of the temperature of the engine coolant Tw. The rail pressure sensor 17 is configured and arranged to detect the fuel pressure (fuel injection pressure) inside the common rail 2, and output a signal to the control unit 20 that is indicative of the fuel pressure (fuel injection pressure) inside the common rail 2. The temperature sensors 21, 22 and 23 are configured and arranged to detect the exhaust gas temperature in the general vicinity of the outlets of the oxidation catalytic converter 11, the NOx trapping catalytic converter 12, and the particulate filter 13, respectively. The temperature sensors 21, 22 and 23 are configured and arranged to output signals to the control unit 20 that are indicative of the exhaust gas temperature in the general vicinity of the outlets of the oxidation catalytic converter 11, the NOx trapping catalytic converter 12, and the particulate filter 13, respectively. The exhaust gas sensor 24 is configured and arranged in the exhaust passage 6 at a position upstream of the turbine 4b to detect the air fuel ratio or the oxygen concentration of the exhaust gas. The exhaust gas sensor 24 is configured and arranged to output a signal to the control unit 20 that is indicative of the air fuel ratio or the oxygen concentration of the exhaust gas.

Accordingly, the control unit 20 controls the regeneration of the NOx trapping catalytic converter 12 and the particulate filter 13. In other words, the control unit 20 controls the fuel injection quantity Qf delivered by the fuel injection valves 3, the injection timing IT of the fuel injection valves 3 in accordance with various engine operating conditions (e.g., accelerator position). The control unit 20 further configured to execute control to adjust the opening degree of the intake air throttle valve 8 so as to obtain the excess air ratio (lean or rich) requested based on the operating conditions. The control unit 20 further configured to execute feedback control to adjust the opening degree of the EGR valve 10 so as to achieve the target EGR ratio in each operating circumstance. The control unit 20 further configured to execute regeneration control to desorb and deoxidize the NOx held by the NOx trapping catalytic converter 12 when it is determined that the total NOx absorbed to the NOx trapping catalytic converter 12 has reached a prescribed value. The control unit 20 further controls the regeneration of the particulate filter 13 by executing regeneration control to raise the exhaust gas temperature and thereby combust/remove the particulate matter when the amount of particulate matter captured in the particulate filter 13 has reached a prescribed amount.

A basic characteristic feature of in this embodiment of the present invention is that the feedback control of the EGR ratio is restricted by the control unit 20 when the excess air ratio is adjusted in order to prevent hunting of the EGR ratio and avoid degradation of the engine operating performance. In other words, in the present invention, the feedback control of the exhaust gas recirculation is restricted when the excess air ratio is adjusted by using the intake throttle valve 8, e.g., when the excess air ratio is reduced. Consequently, even if a response delay occurs between the operation of the intake throttle valve 8 and the actual change in the intake air quantity, the EGR quantity will not undergo temporary hunting and the degradation of the operating performance can be avoided. Meanwhile, when the intake air quantity stabilizes, the feedback control is resumed so that the targeted EGR ratio can be maintained with good precision.

In relation to the present invention, the control unit 20 carries out the functions of a feedback control section, an excess air ratio control section and a feedback control restricting section. The feedback control section is configured to feedback-control an exhaust gas recirculation quantity of the exhaust gas to be recirculated to the air intake system. The excess air ratio control section is configured to adjust an excess air ratio in response to a request to change the excess air ratio by using the intake air regulating device to change an intake air quantity. The feedback control restricting section is configured to temporarily restrict feedback control of the exhaust gas recirculation quantity delivered by the exhaust gas recirculation control device when the excess air ratio is being adjusted.

Figure 2:
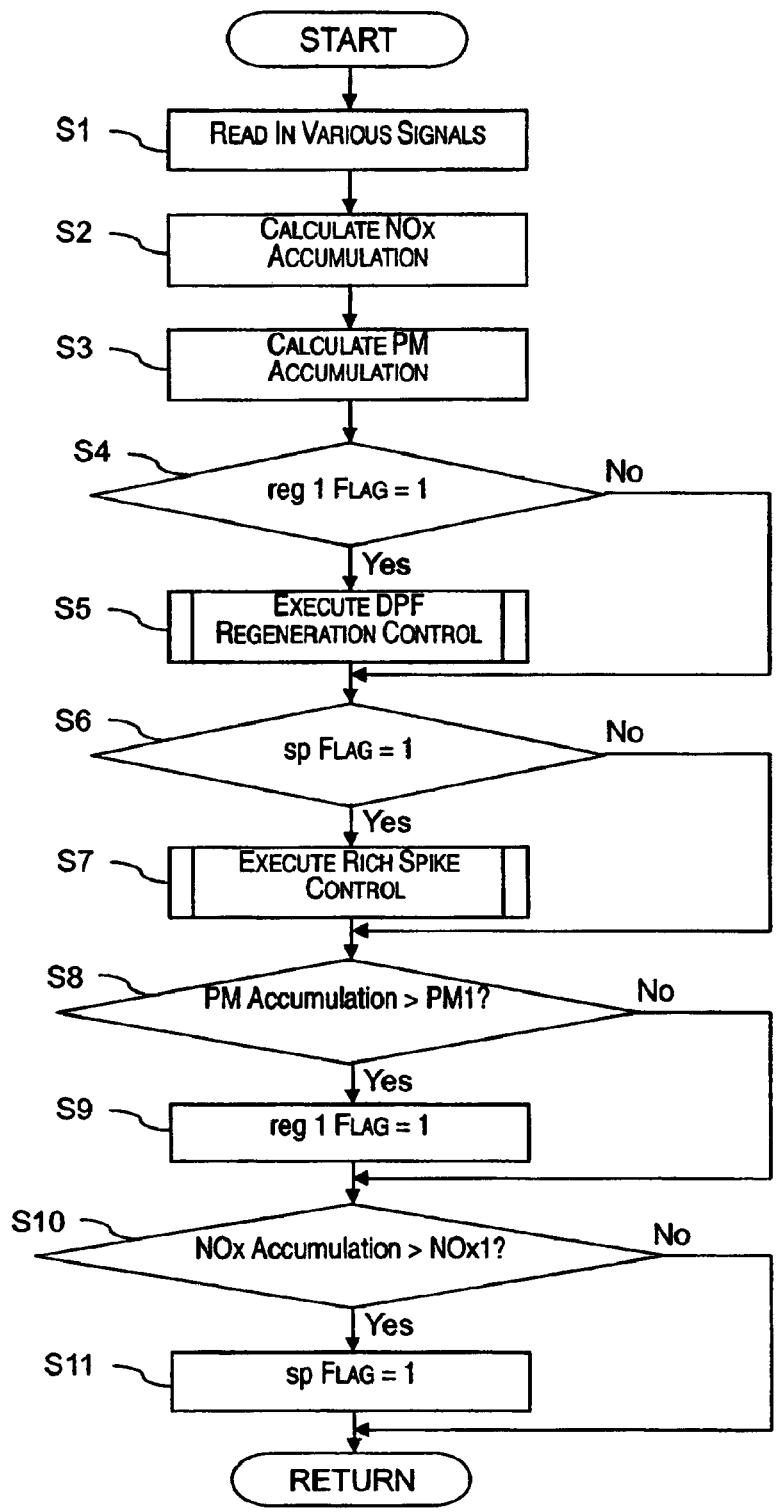
FIG. 2 is a flowchart showing the control operations executed by the control unit of the exhaust gas recirculation control apparatus or system in accordance with one embodiment of the present invention.
Figure 3:
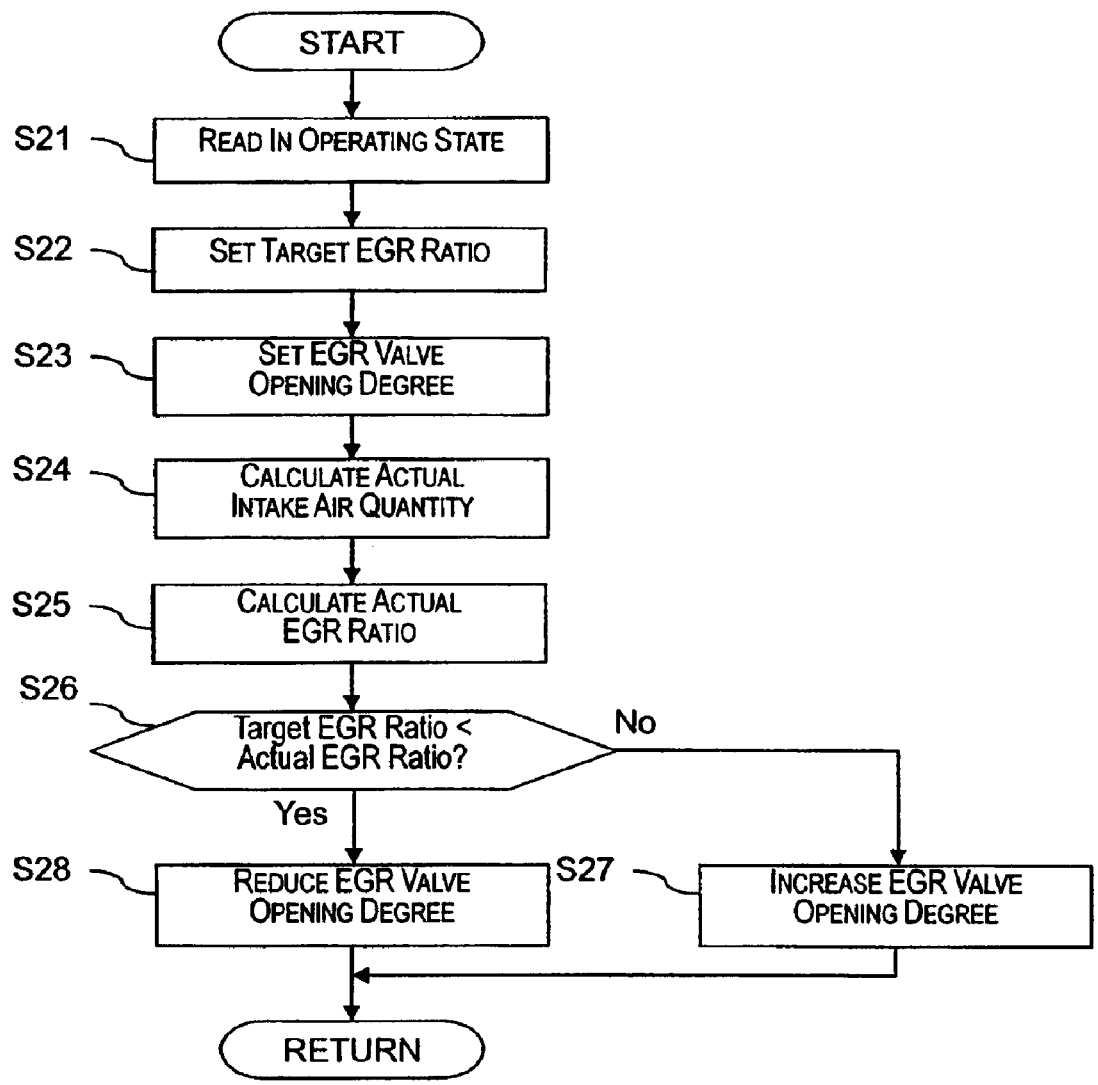
FIG. 3 is a flowchart showing the control operations executed by the control unit of the exhaust gas recirculation control apparatus or system in accordance with one embodiment of the present invention in order to feedback control the EGR.

These control routines of FIGS. 2 and 3 are periodically executed in a cyclic manner at a prescribed fixed time interval when the engine 1 is operating in accordance with certain predetermined engine operating conditions. First, the exhaust gas cleaning control executed by the control unit 20 will now be described with reference to FIG. 2.

In step S1, the control unit 20 reads in various signals from each of the sensors shown in FIG. 1 that represent engine operating conditions including, but not limited to, the engine rotational speed Ne, the accelerator position APO, the fuel injection quantity, and the engine coolant temperature. In other words, the engine operating state, e.g., load condition and rotational speed condition, of the engine 1 is determined by the control unit 20 receiving signals from each of the sensors shown in FIG. 1.

In step S2, the control unit 20 calculates the amount of NOx trapped and accumulated (adsorbed) in the NOx trapping catalytic converter 12. There are various known methods of calculating the NOx accumulation amount using theses signals from the sensors of FIG. 1. For example, the NOx accumulation amount can be estimated based on the distance the vehicle has traveled and/or a value obtained by integrating the engine rotational speed Ne. When the value of an integral is used, the integral value is reset at the point in time when regeneration control of NOx trapping catalytic converter 12 is completed.

In step S3, the control unit 20 calculates the amount of particulate matter (PM) captured and accumulated in the DPF 13. One method of calculating the PM accumulation amount is to utilize the fact that the exhaust gas pressure in the vicinity of the inlet of the DPF 13 increases when the amount of PM accumulated in the DPF increases, and then estimate the PM accumulation amount by comparing the detected exhaust gas pressure in the vicinity of the inlet with a reference exhaust gas pressure for the current engine operating conditions (e.g., engine rotational speed and fuel injection quantity). The PM accumulation amount can also be estimated based on a combination of an integral of the engine rotational speed since the last regeneration of the DPF, the traveling distance since the last regeneration of the DPF, and the exhaust gas pressure.

In step S4, the control unit 20 determines if the reg1 flag is on, indicating that the apparatus is in the DPF regeneration mode. If the value of the reg1 flag is 1, then the control unit 20 proceeds to step S5 and executes regeneration control of the DPF 13. If the reg1 flag is not set to 1, then the control unit 20 proceeds to step S6.

During regeneration control of the DPF 13, the exhaust temperature is raised by using such techniques as executing a post-injection of fuel in which the PM captured in the DPF 13 is combusted. When regeneration control of the DPF 13 is finished, the value of the reg1 flag is set to 0.

In step S6, the control unit 20 determines if the sp flag is on, indicating that the NOx trapping catalytic converter 12 is in a regeneration mode, i.e., rich spike mode (shifting of the excess air ratio λ to a rich value) for the purpose of desorbing and cleaning the NOx adsorbed by the NOx trapping catalytic converter 12. If the value of the sp flag is 1, then the control unit 20 proceeds to step S7 where it executes rich spike control (NOx trapping catalytic converter regeneration control). If the sp flag is not set to 1, then the control unit 20 proceeds to step S8.

The NOx trap catalyst regeneration control involves lowering the excess air ratio to a rich target value. The opening degree of the intake air throttle valve 8 is reduced, causing the excess air ratio of the exhaust gas to become rich, and the NOx accumulated (adsorbed and held) in the NOx trapping catalytic converter 12 during lean operation is desorbed and deoxidized. When the excess air ratio is adjusted, the fuel injection quantity is not changed and thus remains the same both before and after the adjustment. In short, the fuel injection quantity is computed based on the accelerator position, engine rotational speed, etc., and the excess air ratio is adjusted by adjusting the opening degree of the intake air throttle valve 8 so that the engine torque does not fluctuate during the period before and after the adjustment. When the rich spike control of the NOx trapping catalytic converter 12 is finished, the sp flag is set to 0.

In step S8, the control unit 20 determines if the PM accumulation amount of the DPF 13 calculated in step S3 has reached the prescribed amount PM1, indicating that it is time to regenerate the DPF 13. If the PM accumulation amount is larger than PM1, then the control unit 20 determines that it is time to regenerate the DPF 13 and turns on the reg1 flag (i.e., sets the value of the reg1 flag to 1) in step S9 to indicate that regeneration is in progress. If the PM accumulation amount is smaller than PM1, then the control unit 20 proceeds to step S10.

In step S10, the control unit 20 determines if the amount of the NOx accumulated in the NOx trapping catalytic converter 12 has reached the prescribed amount NOx1, indicating that it is time to regenerate the NOx trapping catalytic converter 12. If the NOx accumulation amount is larger than the NOx1, then the control unit 20 determines that it is time to regenerate the NOx trapping catalytic converter 12 and turns on the sp flag (i.e., sets the value of the sp flag to 1) in step S11 to indicate that regeneration of the NOx trap flag is in progress.

The feedback control of the EGR valve 10 executed by the control unit 20 will now be described with reference to FIG. 3.

In step S21, the control unit 20 reads in signals representing the operating state of the engine 1, but not limited to such factors as the engine rotational speed, and the fuel injection quantity. In step 22, the control unit 20 refers to a map to set the target EGR ratio in accordance with the operating state of the engine 1. In other words, the target EGR ratio is set at least in accordance with whether an excess air ratio is required to be lean or rich.

In step S23, the control unit 20 calculates and sets the opening degree of the EGR valve 10 in order to achieve the target EGR ratio in accordance with the adjustment of the intake air throttle valve 8.

In step S24, the control unit 20 calculates or estimates the actual intake air quantity based on the output of the air flow meter 7.

In step S25, the control unit 20 calculates the target air intake quantity based on the target EGR ratio, the fuel injection quantity delivered to the engine main body 1, and the intake air throttle valve opening degree at that particular time. Then the control unit 20 estimates the actual EGR quantity based on the target intake air quantity and the actual intake air quantity and calculates the actual EGR ratio based on the actual air intake quantity and the actual EGR quantity.

In step S26, the control unit 20 compares the target EGR ratio to the actual EGR ratio. If the actual EGR ratio is smaller than the target EGR ratio, then the control unit 20 proceeds to step S27 and increases the opening degree of the EGR valve 10 by a fixed amount so as to increase the EGR ratio. Conversely, the if the actual EGR ratio is larger than the target EGR ratio, then the control unit 20 proceeds to step S28 and decreases the opening degree of the EGR valve 10 by a fixed prescribed amount.

In this way, the control unit 20 feedback controls the opening degree of the EGR valve 10 so as to make the actual EGR ratio match a target EGR ratio set according to the operating state of the engine 1.

The control of the EGR valve 10 executed when the excess air ratio is adjusted from a lean value to a rich value will now be described using the flowchart of FIG. 4.

Figure 4:
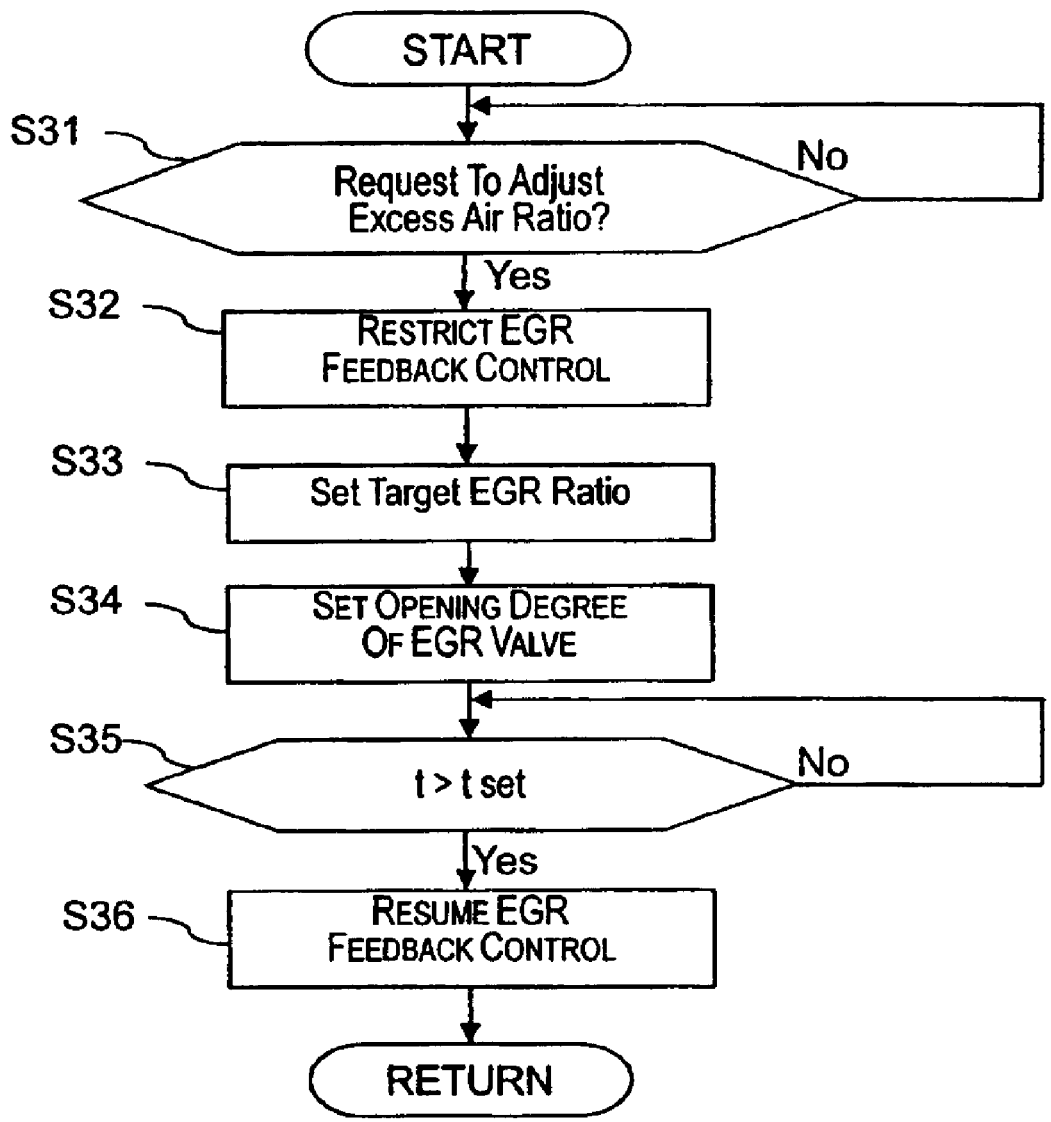
FIG. 4 is a flowchart showing the control operations executed by the control unit of the exhaust gas recirculation control apparatus or system in accordance with one embodiment of the present invention in order to adjust the excess air ratio.

The control sequence shown in FIG. 4 is executed when, during the processing of FIG. 2, the NOx accumulation amount reaches the prescribed value NOx1, the sp flag is set to 1, and the excess air ratio is adjusted from lean to rich.

First, in step S31, the control unit 20 determines if the excess air ratio will be adjusted from lean to rich, e.g., a request to adjust the excess air ratio from lean to rich. If so, the control unit 20 proceeds to step S32 and restricts the feedback control of the EGR ratio. In this embodiment, the restriction is a temporary prohibition of the feedback control of the EGR ratio.

In step S33, the control unit 20 sets the target EGR ratio based on the rich excess air ratio that is desired or needed for executing regeneration control of the NOx trapping catalytic converter 12. In step S34, the control unit 20 refers to the aforementioned map and sets the opening degree of the EGR valve 10 so as to achieve the new target EGR ratio having a rich value.

In step S35, the control unit 20 determines if the time t elapsed since the opening degree of the EGR valve 10 was set has reached a predetermined fixed waiting time tset. The waiting time tset is set, for example, to a value corresponding to the amount of time (delay time) required for the intake air quantity to change after the opening degree of the intake air throttle valve 8 is reduced for the purpose of switching the excess air ratio from a lean value to a rich value.

If the waiting time tset has elapsed, the control unit 20 proceeds to step S36, where it begins feedback control of the opening degree of the EGR valve, and ends the processing sequence.

The feedback control of the EGR valve 10 will now be described centering on the operations performed when adjusting the excess air ratio from a lean state to a rich state.

During lean operation, the opening degree of the EGR valve 10 is feedback controlled so as to achieve the targeted EGR ratio.

After the target EGR ratio is determined, then the target intake air quantity and the target opening degree of the EGR valve 10 are determined in accordance with the opening degree of the intake air throttle valve 8 at that particular point in time. So long as the operating state does not change and the total flow rate of the intake air and recirculated exhaust gas drawn into the engine 1 remain the same, then the intake air quantity or flow rate decreases in a relative manner when the EGR quantity increases and increases in a relative manner when the EGR quantity decreases.

Thus, the actual EGR ratio can be calculated based on the output of the air flow meter 7, which measures the intake air quantity. Thus, the opening degree of the EGR valve 10 can be feedback controlled such that the actual EGR ratio matches the target EGR ratio.

Although EGR reduces the amount of NOx contained in the exhaust gas, it can cause an increase in smoke if the EGR ratio becomes larger than the target EGR ratio. Therefore, by feedback controlling the opening degree of the EGR valve 10 as described, the EGR ratio can be controlled accurately to the target EGR ratio value and both the reduction of NOx and the prevention of an increase in smoke can be accomplished.

When the accumulated amount of NOx adsorbed and held by the NOx trapping catalytic converter 12 during lean operation reaches a prescribed upper limit value, the NOx trapping catalytic converter 12 can no longer adsorb NOx. When this occurs, the control unit 12 executes a catalyst regeneration operation in which the excess air ratio is adjusted from lean to rich.

In order to adjust the excess air ratio to a rich value, the opening degree of the intake air throttle valve 8 is reduced to a prescribed target opening degree. Since the negative pressure of the air intake system increases as a result, the amount of the exhaust gas recirculated from the EGR passage 9 (which is connected downstream of the intake air throttle valve 8) will increase greatly if the opening degree of the EGR valve 10 is left unchanged. Therefore, the opening degree of the EGR valve 10 is also reduced to a target EGR ratio suited to rich operation.

However, the following problem will occur if the feedback control of the EGR ratio is executed continuously through the adjustment process.

Although the opening degrees of the intake air throttle valve 8 and the EGR valve 10 are adjusted simultaneously, there is a delay time between when the opening degree of the intake air throttle valve 8 changes and when the intake air quantity changes in response. In short, the intake air quantity does not change immediately.

If feedback control of the EGR valve 10 is continued, the EGR quantity will be insufficient when the opening degree of the EGR valve 10 is adjusted to the rich target value because the intake air quantity will be large in comparison with the target EGR ratio. Then, the feedback control will correct the opening degree of the EGR valve 10 to a much larger value based on the output of the air flow meter 7. As a result, the EGR quantity will increase while the intake air quantity decreases with time and EGR ratio will momentarily become much larger than the requested target value. After that, the feedback control will again correct the opening degree of the EGR valve 10 to a smaller opening. In short, the feedback control will undergo hunting and the EGR ratio will exhibit large fluctuations, causing the engine to exhibit unstable operating performance and such effects as noise and vibrations.

When the excess air ratio is reduced to the rich state, the EGR ratio is also set to a smaller value than is used during lean operation in order to avoid increasing the amount of smoke in the exhaust gas. If, as just described, the EGR ratio increases, even momentarily, after the excess air ratio is reduced, the effect on the exhaust performance will be too significant to be ignored.

In view of the problem just described, this embodiment temporarily prohibits feedback control of the EGR valve 10 when the excess air ratio is adjusted from lean to rich. Thus, this embodiment instead uses open-loop control (feed forward control) to adjust the opening degree of the EGR valve 10 to the target value.

Thus, even if a response delay occurs between reduction of the opening degree of the intake air throttle valve 8 and the change in the intake air quantity, the opening degree of the EGR valve 10 (which is adjusted simultaneously) will not repeatedly increase and decease due to hunting. Instead, during this response delay period, the actual EGR ratio does not change immediately to the target EGR ratio but converges on the target EGR ratio with some degree of delay.

As a result, engine output fluctuations and worsened noise and vibration resulting from temporary excessive EGR can be avoided.

When the intake air quantity response delay associated with changing the excess air ratio is over, normal feedback control is resumed. Thereafter, the opening degree of the EGR valve 10 is accurately feedback controlled so as to maintain the target EGR ratio. In short, stable, precise EGR control is executed without increasing the smoke or other emissions in the exhaust gas.

As previously explained, with this embodiment, the feedback control of the exhaust gas recirculation is restricted when the excess air ratio is adjusted by using the intake air throttle valve 8, e.g., when the excess air ratio is reduced. Consequently, even if a response delay occurs between the operation of the intake air throttle valve 8 and the actual change in the intake air quantity, the EGR valve will not respond excessively and the EGR quantity will not undergo temporary hunting, thus enabling degradation of the operating performance to be avoided. Meanwhile, when the intake air quantity stabilizes, the feedback control is resumed so that the targeted EGR ratio can be maintained with good precision and NOx reduction and smoke prevention can be accomplished.

By setting the time period during which feedback control of the EGR is temporarily restricted to be equivalent to the time period of the response delay of the actual intake air quantity with respect to the change in the opening degree of the intake air throttle valve 8, the amount of time during which feedback control is restricted can be held to the minimum necessary and degradation of the exhaust performance can be curbed to the greatest degree possible.

The feedback control of the EGR in this embodiment is executed while estimating the actual EGR ratio based on the fuel injection quantity and the opening degree of the intake air throttle valve (both of which are calculated by the control unit 20 in accordance with the operating state), as well as the intake air quantity detected by the air flow meter 7. As a result, the feedback control can be executed with good precision without installing any special sensors or the like.

Although in this embodiment the feedback control of the EGR valve 10 is temporarily prohibited when the excess air ratio is adjusted from rich to lean, it is also possible to temporarily lower the control gain of the feedback control so as to delay the response of the feedback control and prevent hunting. When the control gain of the feedback control is lowered, corrections imposed by the feedback control do not take effect immediately and the opening degree of the EGR valve 10 is prevented from repeatedly increasing and decreasing, thus increasing the stability of the control during adjustment of the excess air ratio.

Additionally, during the period when the excess air ratio is being adjusted, in addition to prohibiting feedback control of the EGR valve 10, it is possible to calculate the EGR ratio during the adjustment period by interpolating based on the lean and rich target EGR ratios and the actual excess air ratio, use the interpolated EGR ratio as the target EGR ratio during the response delay period of the intake air quantity, and then execute open-loop control of the opening degree of the EGR valve 10 based on this target value.

In such a case, during the period from when the opening degree of the intake air throttle valve 8 is adjusted from lean to rich until the actual intake air quantity catches up with the change, the opening degree of the EGR valve 10 is controlled successively to target opening degrees calculated by interpolation and the EGR quantity is accurately controlled in accordance with the actual excess air ratio. As a result, the stability of the engine combustion performance can be improved during the period when the excess air ratio is transient.

Although in the previously described embodiment the feedback control of the EGR is temporarily restricted when the excess air ratio is adjusted from lean to rich, it is also possible to execute a similar control (restriction) during adjustments from rich to lean.

It is also possible to feedback control the EGR quantity by calculating the excess air ratio of the exhaust gas based on the detection value of the exhaust gas sensor 24 and estimating the EGR quantity based on the calculated excess air ratio of the exhaust gas, the intake air quantity, and the opening degree of the intake air throttle valve.

Adjusting the excess air ratio from lean to rich is not limited to regeneration control of the NOx trapping catalytic converter 12. It is also acceptable to adjust the excess air ratio in response to requests related to such factors as the activity state of the catalyst.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-283288. The entire disclosure of Japanese Patent Application No. 2003-283288 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An exhaust gas recirculation control system comprising:
   exhaust gas recirculation control means for recirculating a portion of exhaust gas from an exhaust system of an engine to an air intake system of the engine;
   intake air regulating means for regulating air intake at a position upstream of a position where the exhaust gas recirculation control device connects to the air intake system;
   feedback control section means for feedback controlling an exhaust gas recirculation quantity of the exhaust gas to be recirculated to the air intake system;
   excess air ratio control means for adjusting an excess air ratio in response to a request to change the excess air ratio by using the intake air regulating device to change an intake air quantity; and feedback control restricting means for temporarily restricting feedback control of the exhaust gas recirculation quantity delivered by the exhaust gas recirculation control device when the excess air ratio is being adjusted.

2. A method of controlling exhaust gas recirculation in an engine comprising:

recirculating a portion of exhaust gas from an exhaust system of the engine to an air intake system of the engine;

regulating air intake at a position upstream of a position where the exhaust gas recirculation control device connects to the air intake system;

adjusting an excess air ratio in response to a request to change the excess air ratio by using the intake air regulating device to change an intake air quantity;

feedback controlling an exhaust gas recirculation quantity of the exhaust gas to be recirculated to the air intake system; and temporarily restricting feedback control of the exhaust gas recirculation quantity delivered by the exhaust gas recirculation control device when the excess air ratio is being adjusted.

3. An exhaust gas recirculation control system comprising:

an exhaust gas recirculation control device configured to recirculate a portion of exhaust gas from an exhaust system of an engine to an air intake system of the engine;

an intake air regulating device arranged in the air intake system at a position upstream of a position where the exhaust gas recirculation control device connects to the air intake system; and a control unit configured to control the exhaust gas recirculation control device and the intake air regulating device, the control unit including a feedback control section configured to feedback control an exhaust gas recirculation quantity of the exhaust gas to be recirculated to the air intake system;

an excess air ratio control section configured to adjust an excess air ratio in response to a request to change the excess air ratio by using the intake air regulating device to change an intake air quantity; and a feedback control restricting section configured to temporarily restrict feedback control of the exhaust gas recirculation quantity delivered by the exhaust gas recirculation control device when the excess air ratio is being adjusted.

4. The exhaust gas recirculation control system as recited in claim 3, wherein the feedback control section is configured to estimate an actual exhaust gas recirculation ratio based on an actual air intake quantity and a target air intake quantity calculated based on a fuel delivery quantity of the engine and an opening degree of the intake air regulating device, and to feedback control the exhaust gas recirculation quantity to make the actual exhaust gas recirculation ratio that was estimated substantially match a target exhaust gas recirculation ratio.

5. The exhaust gas recirculation control system as recited in claim 3, further comprising an air flow meter arranged upstream of the intake air regulating device to detect the intake air quantity based on an output of the air flow meter.

6. The exhaust gas recirculation control system as recited in claim 3, wherein the excess air ratio control section is configured to control the intake air regulating device such that the intake air quantity is reduced, and the excess air ratio is adjusted to a prescribed rich fuel-air value when a quantity of NOx adsorbed to a NOx trap catalyst provided in the exhaust system has reached an upper limit value.

7. The exhaust gas recirculation control system as recited in claim 3, wherein the feedback control restricting section is configured to temporarily restrict feedback control by lowering a feedback control gain of the exhaust gas recirculation feedback control to a gain that is below a normal feedback control gain.

8. The exhaust gas recirculation control system as recited in claim 7, wherein the feedback control section is configured to estimate an actual exhaust gas recirculation ratio based on an actual air intake quantity and a target air intake quantity calculated based on a fuel delivery quantity of the engine and an opening degree of the intake air regulating device, and to feedback control the exhaust gas recirculation quantity to make the actual exhaust gas recirculation ratio that was estimated substantially match a target exhaust gas recirculation ratio.

9. The exhaust gas recirculation control system as recited in claim 3, wherein the feedback control restricting section is configured to temporarily restrict feedback control by temporarily prohibiting the feedback control of the exhaust gas recirculation, and the excess air ratio control section is configured to calculate a target exhaust gas recirculation ratio lying between a target exhaust gas recirculation ratio used prior to adjusting the excess air ratio and a target exhaust gas recirculation ratio that is to be used after adjusting the excess air ratio by interpolating based on the excess air ratio, and to execute open-loop control such that a calculated exhaust gas recirculation ratio is achieved.

10. The exhaust gas recirculation control system as recited in claim 9, wherein the feedback control section is configured to estimate an actual exhaust gas recirculation ratio based on an actual air intake quantity and a target air intake quantity calculated based on a fuel delivery quantity of the engine and an opening degree of the intake air regulating device, and to feedback control the exhaust gas recirculation quantity to make the actual exhaust gas recirculation ratio that was estimated substantially match a target exhaust gas recirculation ratio.

11. The exhaust gas recirculation control system as recited in claim 3, wherein the feedback control restricting section is configured to temporarily restrict feedback control by temporarily prohibiting feedback control of the exhaust gas recirculation and execute open-loop control.

12. The exhaust gas recirculation control system as recited in claim 11, wherein the feedback control section is configured to estimate an actual exhaust gas recirculation ratio based on an actual air intake quantity and a target air intake quantity calculated based on a fuel delivery quantity of the engine and an opening degree of the intake air regulating device, and to feedback control the exhaust gas recirculation quantity to make the actual exhaust gas recirculation ratio that was estimated substantially match a target exhaust gas recirculation ratio.

13. The exhaust gas recirculation control system as recited in claim 11, wherein the feedback control section is configured to estimate an actual exhaust gas recirculation ratio based on an actual air intake quantity and a target air intake quantity calculated based on a fuel delivery quantity of the engine and an opening degree of the intake air regulating device, and to feedback control the exhaust gas recirculation quantity to make the actual exhaust gas recirculation ratio that was estimated substantially match a target exhaust gas recirculation ratio.

14. The exhaust gas recirculation control system as recited in the claim 3, wherein the feedback control restricting section is configured to temporarily restrict the feedback control for a period of time generally equivalent to a response delay between the request to change the excess air ratio and the change in the intake air quantity by the intake air regulating device.

15. The exhaust gas recirculation control system as recited in claim 14, wherein the feedback control restricting section is configured to temporarily restrict feedback control by temporarily prohibiting feedback control of the exhaust gas recirculation and execute open-loop control.

16. The exhaust gas recirculation control system as recited in claim 14, wherein the feedback control restricting section is configured to temporarily restrict feedback control by lowering a feedback control gain of the exhaust gas recirculation feedback control to a gain that is below a normal feedback control gain.

17. The exhaust gas recirculation control system as recited in claim 14, wherein the feedback control restricting section is configured to temporarily restrict feedback control by temporarily prohibiting the feedback control of the exhaust gas recirculation, and the excess air ratio control section is configured to calculate a target exhaust gas recirculation ratio lying between a target exhaust gas recirculation ratio used prior to adjusting the excess air ratio and a target exhaust gas recirculation ratio that is to be used after adjusting the excess air ratio by interpolating based on the excess air ratio, and to execute open-loop control such that a calculated exhaust gas recirculation ratio is achieved.

18. The exhaust gas recirculation control system as recited in claim 14, wherein the feedback control section is configured to estimate an actual exhaust gas recirculation ratio based on an actual air intake quantity and a target air intake quantity calculated based on a fuel delivery quantity of the engine and an opening degree of the intake air regulating device, and to feedback control the exhaust gas recirculation quantity to make the actual exhaust gas recirculation ratio that was estimated substantially match a target exhaust gas recirculation ratio.

19. The exhaust gas recirculation control system as recited in claim 14, further comprising an air flow meter arranged upstream of the intake air regulating device to detect the intake air quantity based on an output of the air flow meter.

* * * * *